United States Patent [19]

Van Den Hombergh et al.

[11] Patent Number: 5,038,212
[45] Date of Patent: Aug. 6, 1991

[54] TELETEXT DECODER AND RECIEVER FOR TELEVISION SIGNALS FOR RECEIVING CYCLICALLY TRANSMITTED TELETEXT PAGES

[75] Inventors: Petrus J. F. J. Van Den Hombergh; Jelle Polstra; Ronny M. M. Schurmans, all of Eindhoven; Adrianus C. Tegenbosch, Borkel en Schaft, all of Netherlands

[73] Assignee: U.S. Philips Corporation, New York, N.Y.

[21] Appl. No.: 543,601

[22] Filed: Jun. 25, 1990

[30] Foreign Application Priority Data

Jul. 6, 1989 [NL] Netherlands ............... 8901724

[51] Int. Cl.⁵ ............................................. H04N 7/04
[52] U.S. Cl. ...................................... 358/142; 358/147
[58] Field of Search ....................... 358/142, 146, 147

[56] References Cited

U.S. PATENT DOCUMENTS 4,931,870 6/1990 den Hollander ............... 358/147

FOREIGN PATENT DOCUMENTS 3216365 11/1983 Fed. Rep. of Germany ...... 358/142
3622308 1/1988 Fed. Rep. of Germany .
3634757 1/1988 Fed. Rep. of Germany .
0165583 9/1984 Japan ................................. 358/142

Primary Examiner—Victor R. Kostak
Attorney, Agent, or Firm—William Squire

[57] ABSTRACT

Teletext decoder comprising a decoding circuit (45) and a memory medium (46) in which a reception indication is stored for the transmitted pages so as to indicate whether a requested page is present or not present in a transmitted cycle. The teletext decoder is adapted to determine the duration of the cycle at which the teletext pages are transmitted. It also determines the waiting time for a requested teletext page and to display it on the display screen of a television receiver via a character generator (47). The user is also informed of the occurrence of rotating pages and the reading time of such pages is displayed. The convenience of use of a television receiver with such a teletext decoder is thereby improved considerably.

20 Claims, 7 Drawing Sheets

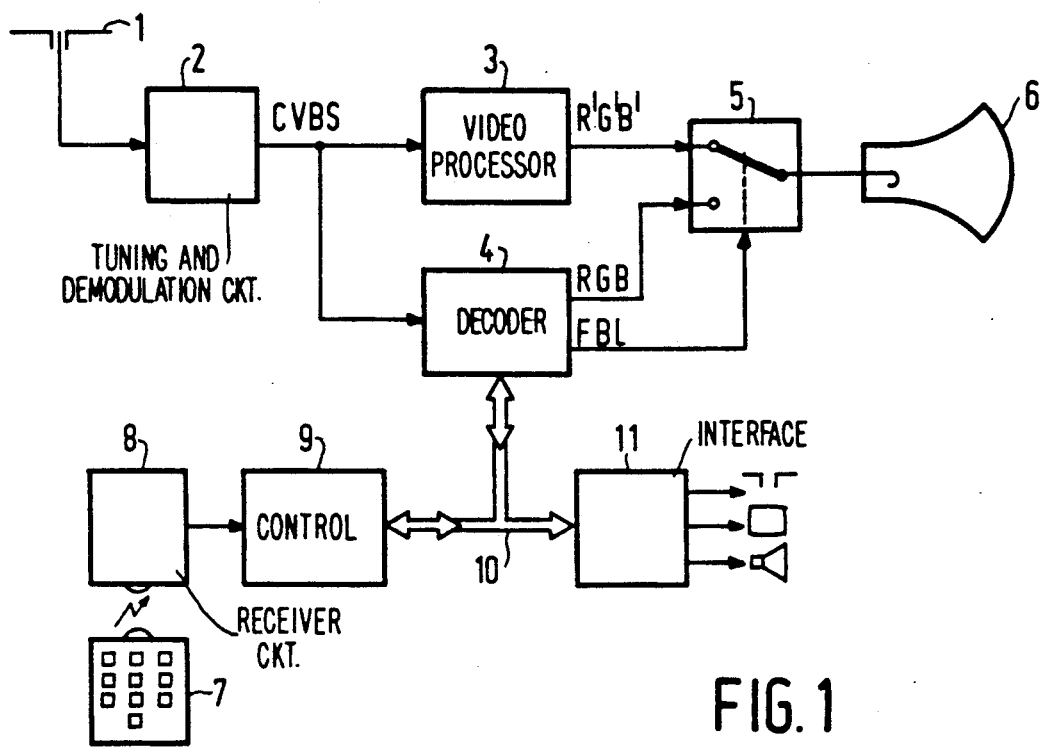
FIG.1
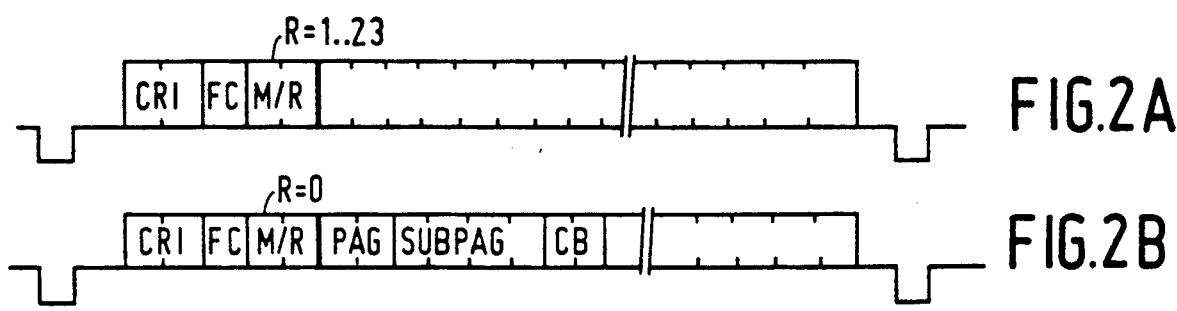
FIG.2A
FIG.2B
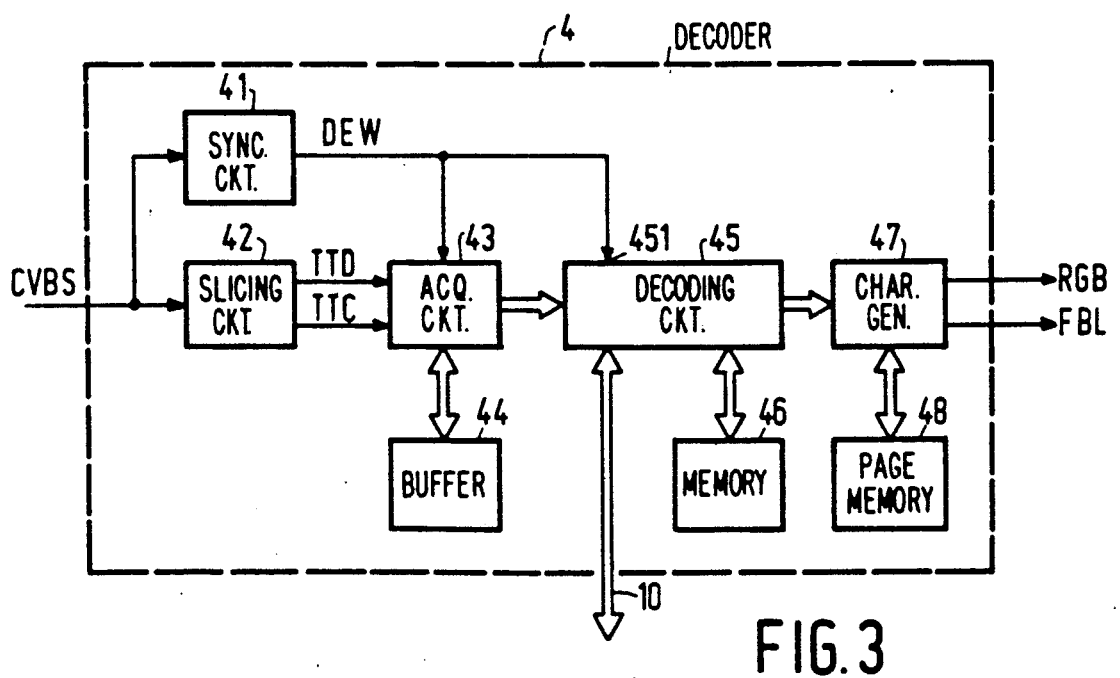
FIG.3

TELETEXT DECODER AND RECIEVER FOR TELEVISION SIGNALS FOR RECEIVING CYCLICALLY TRANSMITTED TELETEXT PAGES

FIELD OF THE INVENTION

The invention relates to a teletext decoder for receiving cyclically transmitted teletext pages, comprising a decoding circuit for determining page numbers of teletext pages present in the transmitted cycle and a memory medium for storing a reception indication for these teletext pages, indicating the presence of said pages in the transmitted cycle. The invention also relates to a receiver for television and teletext signals provided with such a teletext decoder.

BACKGROUND OF THE INVENTION

A television receiver comprising a teletext decoder of the type described in the opening paragraph is known from German Offenlegungsschrift DE 36 22 308 A1. In this teletext decoder the page number of each transmitted teletext page is detected and this page number is stored as a reception indication in the memory medium. The known receiver provides great convenience of use. In fact, if the user requests a teletext page, it is checked whether the page number of the desired page is stored so that the user can be informed whether the desired page is present or not present in the transmitted cycle. If the page number is not stored, the corresponding page is apparently not transmitted and the user will choose another page. If the page number is stored but if the page itself is not immediately available, the user will have to wait for some time until the requested page has been captured and is displayed.

It is to be noted that it will always take some time before all pages have been received once after tuning to another transmitter. The absence of a page number in the memory medium is not a reliable indication of the fact that the relevant page is not present in the transmitted cycle during this period, which will be further referred to as initialization period. Information about this for the user is therefore preferably omitted temporarily. However, the relevant period differs from transmitter to transmitter and a drawback of the known decoder is that the initialization period should be such that it even covers the teletext transmission which is considered to be the slowest. Another drawback of the known teletext decoder is that the user will unjustly wait for reception of a requested page if the corresponding page number is stored in the memory medium but if the relevant page has meanwhile been removed from the teletext program.

SUMMARY OF THE INVENTION

It is an object of the invention to provide a teletext decoder obviating, inter alia the drawbacks of the known teletext decoder and providing the possibility of further improving the convenience of use of a television receiver comprising such a teletext decoder.

According to the invention the teletext decoder is therefore characterized in that the decoding circuit is adapted to determine and store the duration of the cycle at which the pages are transmitted. Thus it is determined for each transmitter when all pages have been received once so that the user can subsequently be given reliable information about the presence or absence of desired pages. It is also determined when a cycle has elapsed so that the storage of reception indications in the memory medium can be repeated, if desired, in order to remove the reception indications of teletext pages which are no longer in the program.

In an embodiment of the teletext decoder according to the invention the duration of the cycle, which will be further referred to as cycle period, is determined by increasing a cycle period count during a predetermined period in response to the reception of a page whose reception indication is not stored yet. If this predetermined period is, for example, 3 seconds, the cycle period count is continuously increased as long as a teletext page which has not been detected earlier is received at least once in 3 seconds. In practice this is the case after switching on and after tuning to another transmitter. New pages will no longer be detected at a certain moment and the cycle period count will no longer be raised after 3 seconds. The stored reception indications are now complete and the cycle period is equal to the cycle period count minus 3 seconds.

A very useful embodiment according to the invention is characterized in that in the case of reception of a teletext page the decoding circuit is further adapted to store a further memory value for page in the memory medium, which value is related to the instant when the page is transmitted. This will be very much appreciated if it is considered that it can now be determined when a selected page will be transmitted again and the user can be informed about the waiting time when requesting a teletext page. The convenience of use of, for example, a television receiver having such a teletext decoder is considerably improved thereby. The waiting time for a requested teletext page may be displayed, for example on the display screen by means of a horizontal or vertical bar decreasing in length, with the length of the bar being reduced to zero as soon as the desired page is captured and displayed.

In practice there are also pages which are transmitted with a deviating cycle period. For example, frequently consulted pages are transmitted more than once per cycle. An embodiment of the teletext decoder is characterized in that the presence of such pages with such an "individual cycle period" is determined and that this individual cycle period is determined by determining and storing the time interval between successive receptions of such a page.

A further embodiment of the teletext decoder is characterized in that the decoding circuit is adapted to determine the highest and the lowest subpage number and store them as further memory values. It is thereby determined whether the transmitted page is a rotating page. Rotating teletext pages are pages whose information contents change regularly in order to provide access under one page number to a multitude of information which a single page cannot contain. For example, stock exchange rates are transmitted on page 570 as a "subcycle" of pages 570/1..570/4 in which/1../4 represent subpage numbers. Non-rotating pages have subpage number 0 in practice. In known teletext decoders rotating pages generally cause problems for the user. For example, the unsuspecting user will not recognize a displayed teletext page as a rotating page until this page unexpectedly changes its contents. The waiting time for an individual subpage also amounts to an unknown number of cycle periods. With the embodiment of the teletext decoder according to the invention it is possible to inform the user at his request for a page that the requested page will rotate. In addition, the reading time of a displayed rotating page can be visualized on the display screen of a receiver. Furthermore, when requesting an individual subpage, the waiting time, which as stated comprises a plurality of cycle periods, is displayed.

A favorable embodiment of the teletext decoder according to the invention is characterized in that the memory medium for storing reception indications and possible further mentioned memory values comprises for each receivable page number a memory location which is addressable by that page number. It is achieved thereby that the reception indications stored for each page number and possible further memory values are directly addressable, which is found to be of great importance in practice so as to render the processing of data possible within the available period. For example, in order to update memory values of a transmitted page or to read memory values of a requested page, it is not necessary to search the corresponding page number in the memory medium, but addressing of predetermined memory locations will suffice. It is to be noted that it is known per se from German Patent Specification DE 36 34 757 C1 to realize the memory medium for storing reception data in such a way. However, this is a memory whose contents are to be transmitted by the transmitter.

DESCRIPTION OF THE FIGURES

FIG. 1 shows the general structure of a television receiver comprising a teletext decoder according to the invention.

FIGS. 2A and 2B show a picture line of a television signal in which a teletext signal is transmitted.

FIG. 3 shows the diagrammatical structure of a teletext decoder according to the invention.

DESCRIPTION OF THE PREFERRED EMBODIMENTS

Figure 4:
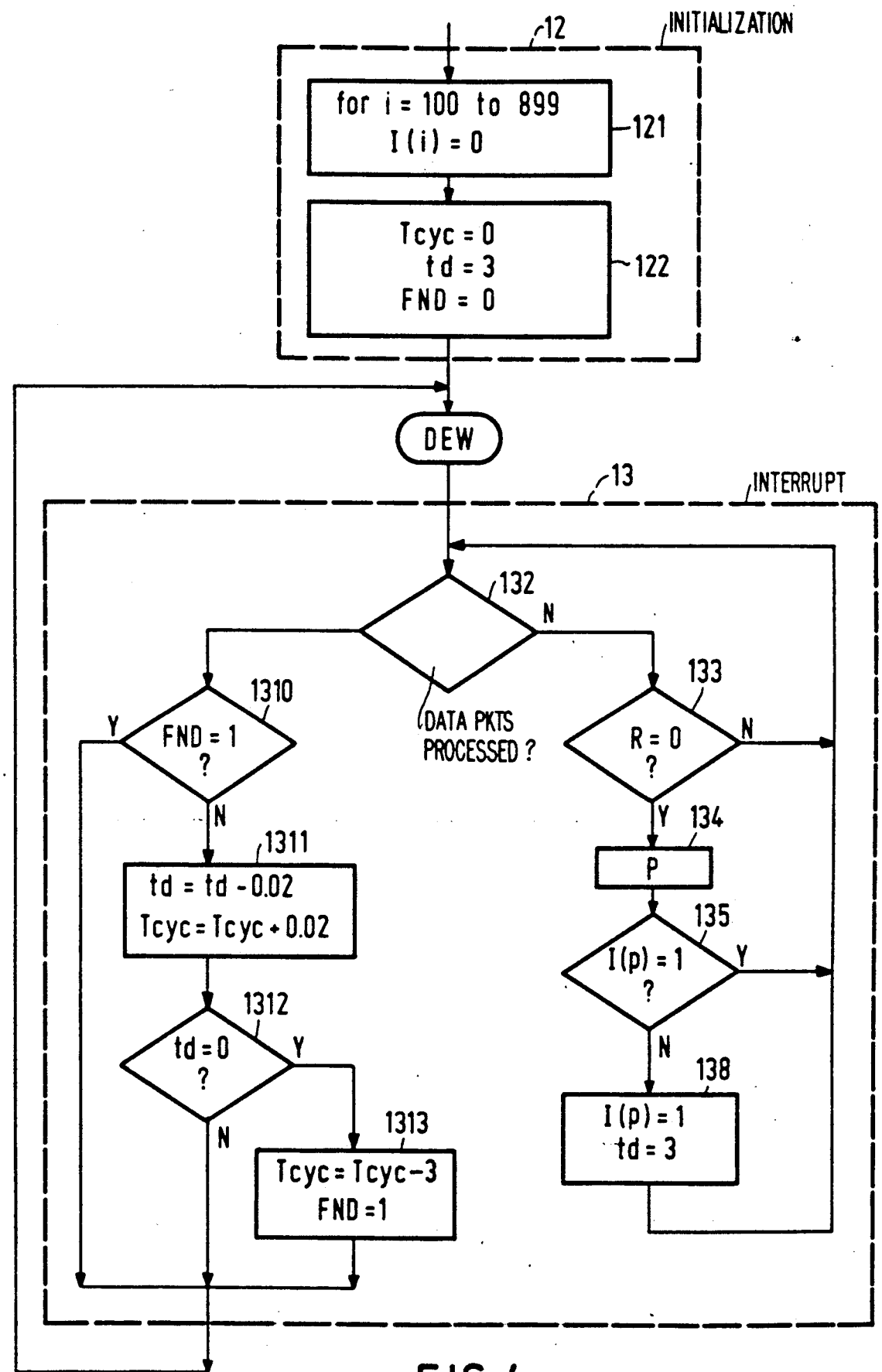
FIG. 4 shows a diagram to explain the operation of the teletext decoder shown in FIG. 3.

FIG. 1 shows the general structure of a television receiver comprising a teletext decoder according to the invention. The transmitter signals received at an antenna 1 are applied to a conventional tuning and demodulation circuit 2. The obtained composite video signal CVBS of the selected television program is applied to a video signal processing circuit 3 and to a teletext decoder 4. In a normal television operating state of the receiver the elementary color signals R'G'B' generated by video signal processing circuit 3 are applied to a display screen 6 via a selector 5 in order that the user can watch the received television program. In a teletext operating state, which can be called by the user, the elementary color signals RGB of teletext decoder 4 are displayed on the display screen 6 via selector 5. Selector 5 is operated by a blanking signal FBL which is generated in the teletext decoder. Operating instructions given by the user are generated in a (remote) control unit 7 and applied to a control circuit 9 via a receiver circuit 8. Teletext decoder 4 is connected to this control circuit 9 by means of a command bus 10. Furthermore an interface 11, which enables control circuit 9 to tune to transmitters, to control brightness and volume and the like, is connected to this command bus. This is indicated by means of appropriate symbols in the Figure.

The composite video signal CVBS comprises one or more picture lines with teletext information during the field flyback interval. In the PAL TV system considered these may be, for example the lines 7–22 and 320–335. As is shown in FIGS. 2A and 2B, such a picture line comprises a so-called data packet of 45 bytes of 8 bits each. The first 2 bytes having a fixed value of 1010..10 are referred to as "clock-run-in" and are denoted by CRI in the Figure. The third byte is a so-called "framing code" FC and has also a fixed value. The next 2 bytes comprise a 3-bit magazine number M and a 5-bit row number R. They are protected from transmission errors by means of additional protection bits. The meaning of the other 40 bytes depends on the value of the row number R. If the row number has one of the values 1–23, as shown in FIG. 2A, the 40 bytes represent a text line of 40 characters for display on a display screen. FIG. 2B shows the data packet in the case where the row number is equal to 0. Such a data packet, which is also referred to as page header, comprises eight page number bits PAG, a 13-bit subpage number SUBPAG and a number of control bits denoted by CB in the Figure. The page number bits PAG, the subpage number SUBPAG and the control bits CB are accommodated in eight bytes of the page header. These eight bytes comprise further additional protection bits against the occurrence of transmission errors. The remaining 32 bytes of the page header represent characters for display on the display screen. The last 8 characters thereof indicate the actual time in practice. A teletext page comprises a page header and 23 text lines. The transmission of a page begins with, and implies the relevant page header and subsequently comprises the relevant text lines. A multitude of teletext pages is transmitted in a repeating cycle. The duration of such a cycle depends on the number of pages and on the number of picture lines which is used for teletext in the field retrace. When using, for example two picture lines per field in a TV system having a 50 Hz field frequency, 100 data packets corresponding to approximately 4 teletext pages are transmitted per second. The duration of a cycle comprising, for example 100 pages is then 25 seconds.

It is to be noted that a teletext page is identified by means of the 3-bit magazine number M and the 8 page number bits PAG. They jointly constitute a 3-digit page identification which will be further referred to as the page number. In practice the numbers 100–899 are often used.

FIG. 3 shows diagrammatically the functional structure of teletext decoder 4 according to the invention. In this decoder the received composite video signal CVBS is applied to a synchronizing circuit 41 and a slicing circuit 42. The synchronizing circuit 41 generates a window signal DEW at a field frequency, which signal occurs during the lines 7–22 and 320–335 in which the teletext signal may be present. The synchronizing circuit 41 also supplies various clock signals (not shown) to the other circuits.

Slicing circuit 42 regenerates a teletext signal TTD and an associated clock signal TTC and applies these signals to an acquisition circuit 43 which also receives the window signal DEW. During the period defined by window signal DEW acquisition circuit 43 checks the received teletext signal TTD on the occurrence of the previously mentioned framing code FC. If this code occurs in the picture line within a predetermined time interval, a valid teletext data packet is apparently received. The next 42 bytes from the signal are then successively stored in a reception buffer 44. This is done autonomously under the control of clock signal TTC which has a frequency of approximately 6.9 MHz in the relevant TV system. After termination of the field flyback interval, the data packets received in this interval are stored in reception buffer 44 and it will again take almost a full TV field of 20 msec before the next picture lines with teletext information are received. The data packets can be further processed during this period. To this end the acquisition circuit 43 is connected to a decoding circuit 45. This decoding circuit is, for example, a microprocessor and is adapted to read and further process the data packets stored in reception buffer 44. More particularly, decoding circuit 45 is adapted to read the row number R and, if R=0, to determine the page number of a transmitted page from the magazine number M and the page number bits PAG. The decoding circuit is further adapted to store a reception indication in a memory medium 46 for the teletext pages which are present in the transmitted cycle. Teletext decoder 4 also comprises a character generator 47 connected to the decoding circuit and the page memory 48 for storing at least the teletext page to be displayed. It is to be noted that in FIG. 3 the structure of the teletext decoder is shown functionally and that there are various possibilities for its actual realization. For example, in practice the acquisition circuit 43 and the character generator 47 will be coupled to decoding circuit 45 via a common data and address bus, and memory medium 46 and page memory 48 will be implemented as one memory. This memory is then also used in known manner for storing program variables and the like.

The operation of the teletext decoder is also based on a program which is performed by the decoding circuit 45. To this end the decoding circuit receives the window signal DEW from synchronizing circuit 41, for example, via a so-called interrupt request input 451, which signal indicates when new teletext data packets are stored in reception buffer 44. The program performs a number of tasks which are irrelevant for the invention. For example, the program establishes which of the received data packets are textlines of a page to be displayed. The bytes of these packets are read in reception buffer 44 and after a possible conversion they are stored in a display format in page memory 48 for display by character generator 47.

Memory medium 46 is adapted to store reception indications indicating the presence of a page in the transmitted cycle. In a favorable embodiment of the teletext decoder the memory medium comprises for each possible page number, a memory location which is addressable by the page number. Since the page number comprises a total number of 11 bits, 2048 memory locations are required. However, as previously stated, the page numbers remain limited in practice to 100-899 so that, if desired, it is sufficient to use 800 memory locations. To indicate whether a page is transmitted or not, 1 bit per memory location suffices. These 1-bit reception indications are further denoted by I(100)-I(899).

In practice a teletext transmission comprises a repeating cycle of successively transmitted pages in which each page is present once. The decoding circuit 45 is adapted to determine and store the duration of this cycle. More particularly, the cycle period is determined by increasing a cycle period count for, for example 3 seconds upon reception of a teletext page which has not been received previously. A decoding program determining the cycle period in such a way is shown in FIG. 4. It comprises an initialization program 12 which is performed after tuning to another transmitter and an interrupt program 13 which is performed each time after the occurrence of the window signal DEW. Initialization program 12 comprises a step 121 in which all 800 reception indications I(100)-I(899) are rendered "0" in memory medium 46 so as to indicate that not a single teletext page has been received yet. Furthermore an initial value 0 is assigned to a cycle period count Tcyc in a step 122 and an elapsed time count td is given an initial value of the 3 seconds. A logic variable FND is given the value "0" so as to indicate that the cycle period is not determined yet. The interrupt program 13 comprises a step 132 in which it is checked in known manner whether the data packets received thus far in reception buffer 44 have been processed. As long as this is not the case it is checked in a step 133 whether the packet to be processed currently is a page header with a row number R=0. If this is not the case, the packet is an ordinary text line whose processing is irrelevant for the invention. The program then returns to step 132 for processing the next available data packet. If the row number is equal to 0, the packet indicates the start of a transmitted teletext page. In a step 134 the page number "p" of this page is determined. Subsequently, it is checked in a step 135 whether this page has previously been transmitted by reading the reception indication I (p) stored in the memory medium 46. If the value which has been read is a logic "1", the page has already previously been transmitted and no further action is taken. The program then returns to step 132. However, if the value which has been read is a logic "0", the relevant page is received for the first time after tuning to the transmitter. In a step 138 the corresponding reception indication is adapted by rendering I(p) "1". Moreover, the elapsed time count td again acquires the initial value of 3 sec. independent of its actual value.

If all data packets received in a field flyback interval are thus processed, the interrupt program checks in a step 1310 whether the cycle period has already been determined. If the cycle period has already been determined (FND="1"), the interrupt program is further terminated. If the cycle period has not yet been determined (FND="0"), the elapsed time count td is decreased by 0.02 sec. in a step 1311 and the cycle period count Tcyc is increased by an identical amount. The chosen value of 0.02 sec. corresponds to the 50 Hz field frequency with which the interrupt program is called. As long as new pages are detected by the interrupt program 13, elapsed time count td regularly acquires the initial value of 3 sec. in step 138 and cycle period count Tcyc is increased by 20 msec. in each TV field in step 1311. From the instant when no new pages are detected, the elapsed time count td is decreased by 0.02 sec. in step 1311 for each TV field and thus reaches the value 0 after 3 sec. This is detected in a step 1312 by the interrupt program. The cycle period then amounts to the value built up in cycle period count Tcyc, minus 3 sec. In a step 1313 Tcyc is adapted accordingly. Moreover, the logic variable FND is rendered "1" in this step so as to indicate that the cycle period is now determined. For performing interrupt program 13 decoding circuit 45 has a field period of 20 msec. available. Practice has proved that there is still time left for the decoding circuit to perform other programs to be described.

It is useful to implement the memory medium 46 in the described embodiment in a double version. It is then possible to repeat the determination of the cycle period and to store reception indications in the one memory medium while the data stored in the other memory medium are available for further use. The teletext decoder then automatically adapts to possible modifications, particularly if pages are removed from the transmitted cycle.

Figure 5:
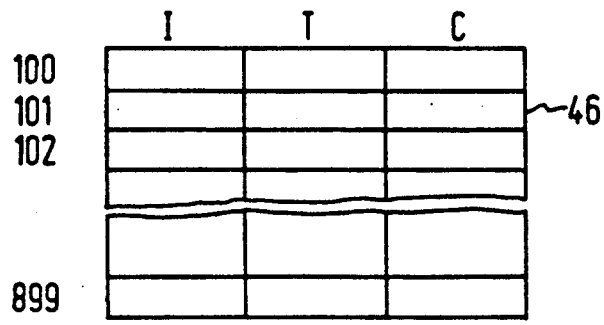
FIG. 5 shows a lay-out of the memory medium for storing reception indications and further memory values.

FIG. 5 shows a lay-out of memory medium 46 for use in a further embodiment of the teletext decoder according to the invention. The memory medium now not only comprises reception indications I(100)-I(899) but also further memory values T(100)-T(899) for storing the instant when the corresponding page was transmitted most recently, and memory values C(100)-C(899) for storing an individual cycle period per page. It is to be noted that the notion "instant" is not necessarily meant to be the absolute time of day, but a relative instant may suffice, for example with respect to the instant of tuning to a transmitter.

Figure 6:
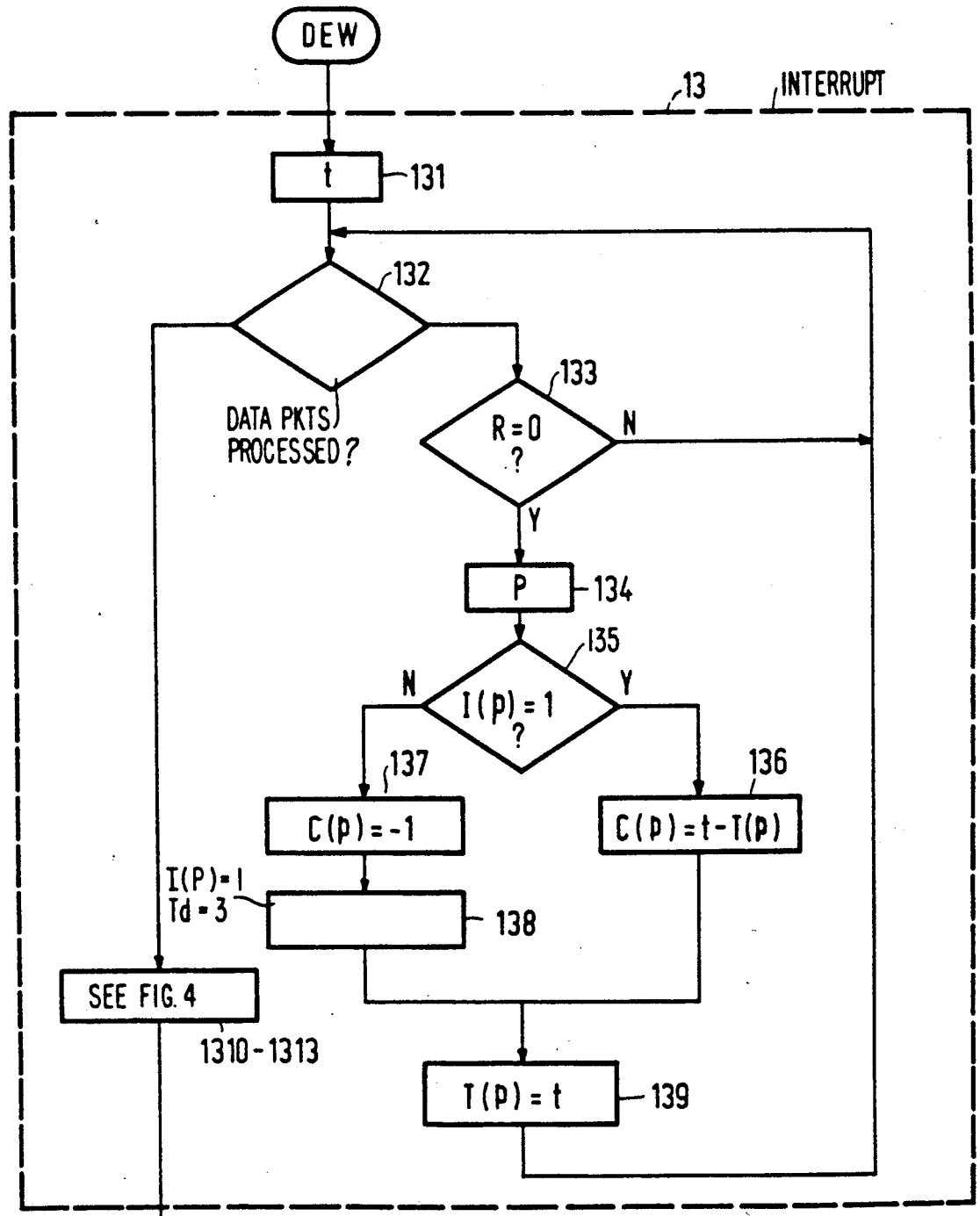
FIG. 6 shows a further diagram to explain the operation of the teletext decoder shown in FIG. 3.

The interrupt program 13 for this embodiment is shown in FIG. 6. In this Figure previously described program steps are denoted by the same reference numerals and possibly summarised. The interrupt program further comprises a step 131 in which the current instant is assigned to a variable "t". In step 132 it is again checked whether there are still data packets to be processed in the reception buffer 44. Subsequently it is checked in step 133 whether the data packet is the page header of a page (R=0) and in step 134 the page number p of this page is determined. In step 135 it is established with reference to reception indication I(p) whether the relevant page has already been transmitted previously. If so, memory value T(p) represents the previous instant of reception and in a step 136 the individual cycle period of the received page is determined and stored in C(p) by subtracting the previous reception instant from the current instant t. If the page has not been received previously, a non-plausible value, for example −1 is provisionally assigned to the individual cycle period C(p) in a step 137. Subsequently the current instant of reception of the page is assigned to the corresponding memory value T(p) in a step 139.

It is to be noted that it is useful to limit the determination and storage of an individual cycle period to the teletext pages which actually have a deviating cycle period. In practice these can be recognized by means of a so-called "interrupted sequence" bit which forms part of the control bits transmitted in the page header (CB in FIG. 2B) and which indicates that the relevant page number is outside the used numerical sequence of transmission. The program steps required for this purpose are not further shown.

Decoding circuit 45 also performs a background program for removing reception indications of pages which have been taken out of the transmitted cycle. This background program regularly determines the difference between the current instant t and the most recent instant of reception T(p) for each page number. If this difference is essentially more than the cycle period Tcyc or the individual cycle period C(p) found for the page, the relevant page has apparently been taken out of the transmitted cycle and the logic value "0" is assigned again to reception indication I(p). Such a background program is an alternative for the previously mentioned embodiment using a double memory medium.

Figure 7A:
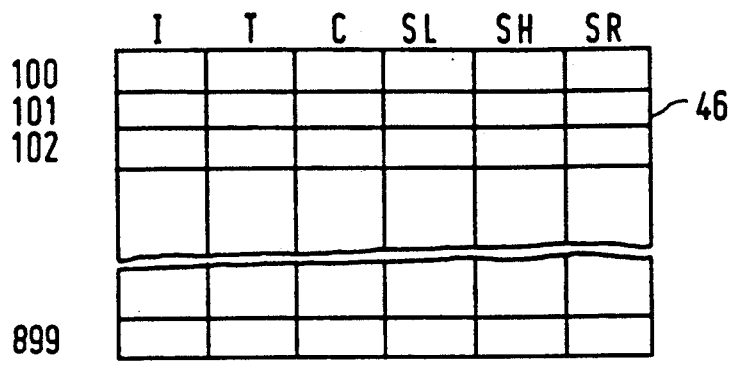
FIGS. 7A and 7B show further lay-outs of the memory medium for storing reception indications and further memory values.
Figure 8:
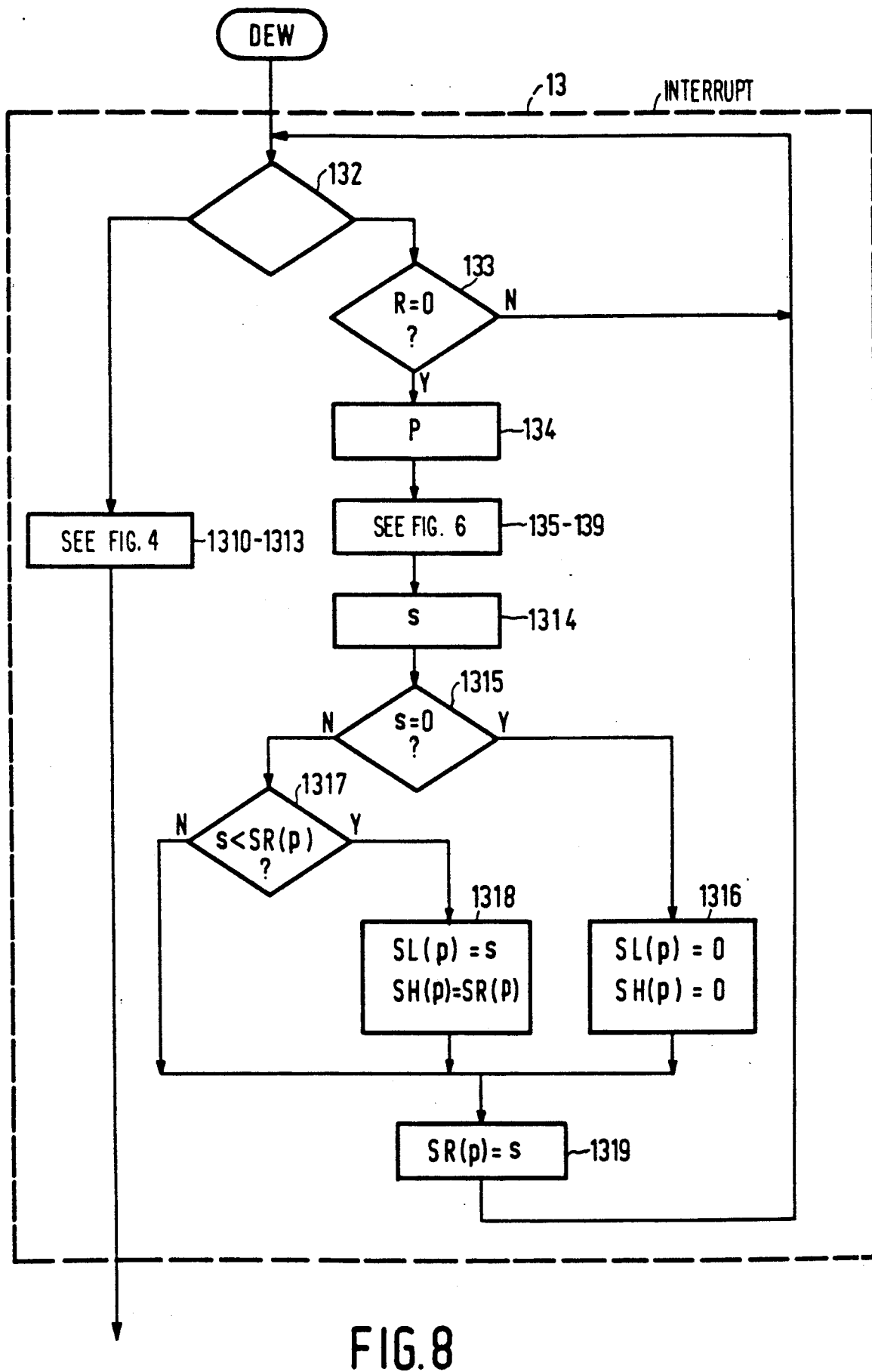
FIG. 8 shows a further diagram to explain the operation of the teletext decoder shown in FIG. 3.

In a further embodiment of the teletext decoder according to the invention the decoding circuit is adapted to store the lowest and highest subpage numbers of rotating teletext pages. FIG. 7A shows a possible lay-out of memory medium 46 for storing subpage numbers. The memory medium now comprises further memory values SH(100)-SH(899) for storing the highest subpage number and memory values SL(100)-SL(899) for storing the lowest subpage number. Moreover, the memory medium comprises memory values SR(100)-SR(899) for storing the most recently transmitted subpage number. A possible interrupt program 13 for this embodiment of the teletext decoder is shown in FIG. 8. This program largely corresponds to the previous interrupt programs shown in FIGS. 4 and 6. In step 132 it is again checked whether there are still data packets to be processed in reception buffer 44. Subsequently it is checked in step 133 whether the data packet is a page header, while in step 134 the page number p is determined and the aforedescribed steps 135-139 for storing reception indication and individual cycle period are performed. In a step 1314 the subpage number (SUBPAG in FIG. 2B) is read and assigned to a variable "s". Subsequently it is checked in a step 1315 whether this subpage number s is equal to 0. If so, the transmitted page is not a rotating page (any more) and in a step 1316 the memory values SL(p) and SH(p) are also rendered 0. If the received subpage number is unequal to 0, it is assumed that the page rotates. In a step 1317 it is then checked whether the actual subpage number s is smaller than the subpage number of this page in the previous cycle, which number is still stored in SR(p). If so, it is assumed in conformity with practice that there is a turning point: being the last of the subcycle, the previous subpage apparently had the highest subpage number and consequently the actual page is the first of the subcycle. In conformity therewith the actual subpage number s is assigned to memory value SL(p) in a step 1318 and SH(p) acquires the value of the previous subpage number which is still stored in SR(p). As long as the received subpage number is not again smaller than the previous one, there is no further adaptation of SL(p) and SH(p). Finally, the received subpage number s is preserved in SR(p) in a step 1319.

Figure 7B:
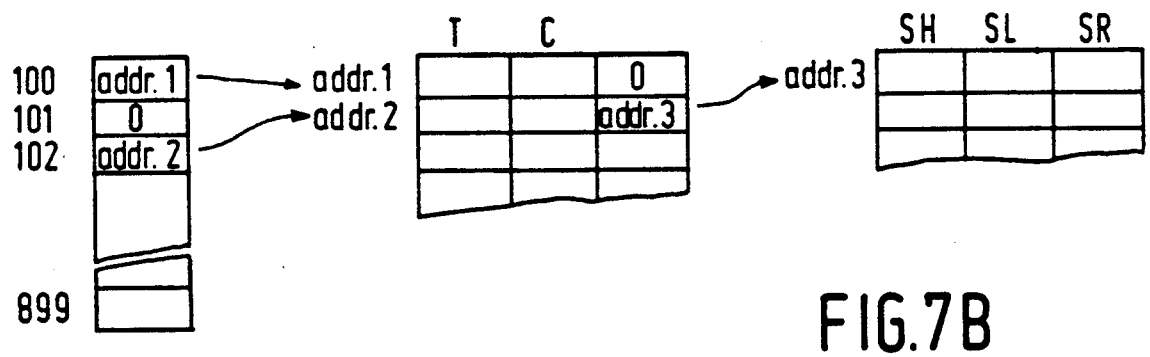

In the interrupt program shown it may be assumed in conformity with practice that the lowest subpage number always has the value 1 in the case of rotating pages. This limits the required quantity of memory in memory medium 46. A further memory reduction may also be achieved by only taking into account the range of the subpage enumeration limited to, for example 0-79 in practice. Variations of the organization of memory medium 46 are alternatively possible. It is notably useful to occupy memory capacity only for storing actually relevant memory values. For example, the storage of subpage numbers SH(p), SL(p) and SR(p) is only relevant for the rotating pages which are generally present in limited quantities. An effective lay-out of memory medium 46 is shown in FIG. 7B. For each possible page number a memory value is stored which has a value "0" for non-transmitted pages and which comprises the address of further relevant memory values for transmitted pages. The Figure shows, inter alia, that page 100 is in the transmitted cycle and does not rotate, page 101 is not in the transmitted cycle and page 102 is a rotating page.

The convenience of use of a television receiver is considerably improved by a teletext decoder as described hereinbefore. As is apparent from FIGS. 1 and 3, control circuit 9 in the receiver is connected to decoding circuit 45 via a command bus 10. The control circuit is thus capable of reading data from memory medium 46 and storing character information for display on the display screen in page memory 48. The operation of the television receiver is further determined by a control program which is stored in the control circuit 9 which is usually implemented as a microprocessor. Such a control program comprises a page request program, a subpage request program and a display program.

Figure 9:
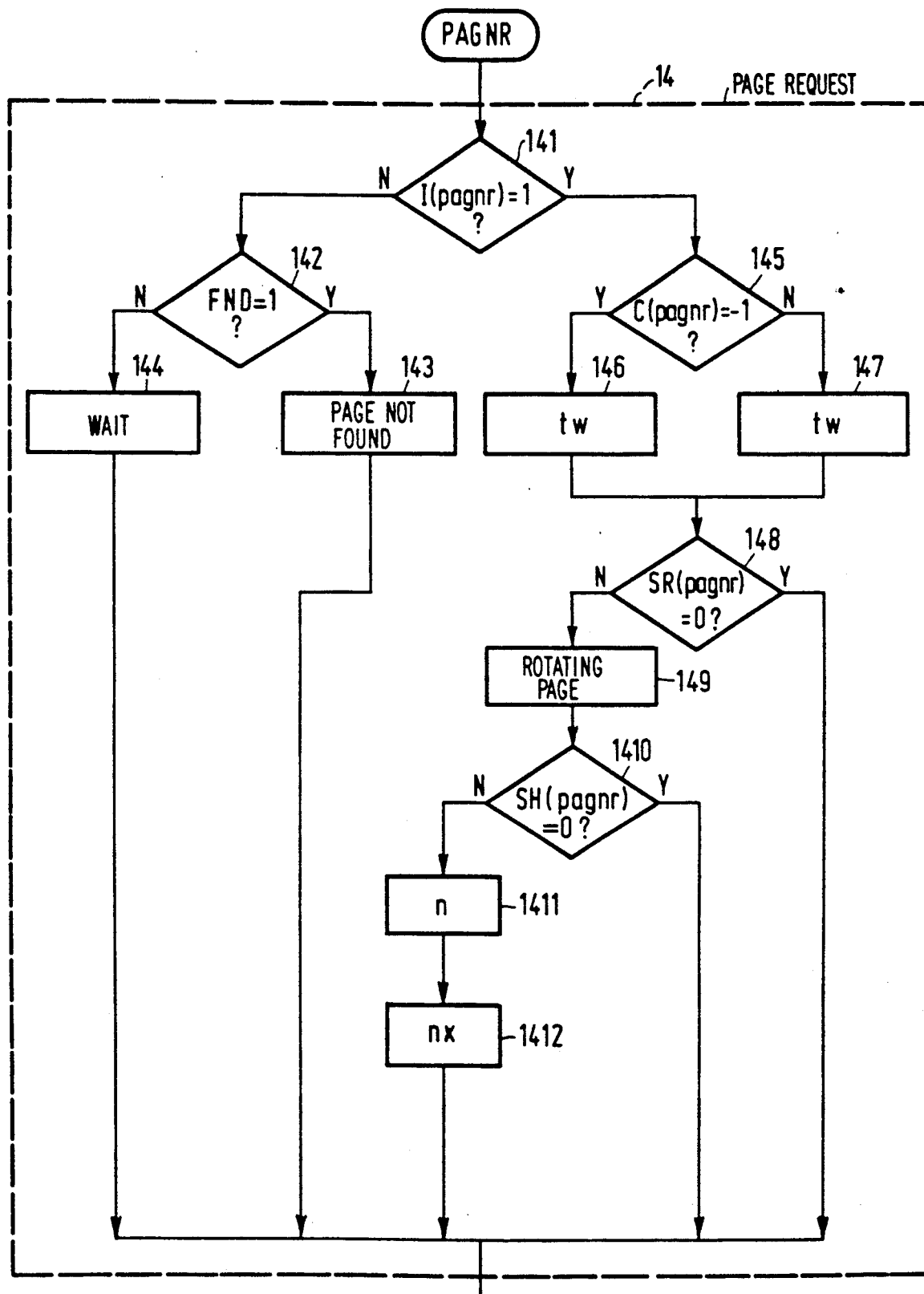

FIG. 9 shows an embodiment of a page request program 14 which is performed after the user has entered a page number "pagnr". It is checked in a step 141 whether the reception indication I(pagnr) of this page has the logic value "1". If this is not the case, the requested page has not previously been in the transmitted cycle. It is then checked in a step 142 whether a cycle of transmitted pages has already been found. In that case (FND="1") the requested page is apparently not in the transmitted cycle, which the user is informed of in a step 143. The user will then choose another page. In the other case (FND="0") the user may be informed, if desired, in a step 144 that the cycle is not determined yet. This situation will occur in practice only a short time after tuning to another transmitter.

If the requested page is transmitted, it is checked in a step 145 whether an individual cycle period is determined for this page. If memory value C(pagnr) still has the non-plausible value −1, it is assumed for the time being that the cycle period corresponds to the "overall" cycle period Tcyc. However, in most cases the individual cycle period C(pagnr) is known. In steps 146 and 147 the waiting time "tw" for the requested page is calculated from the previous instant of reception, the cycle period and the current instant t:

(step 146): $tw = T(pagnr) + Tcyc - t$ (step 147): $tw = T(pagnr) + C(pagnr) - t$ Subsequently it is checked in a step 148 whether the requested page is a rotating page by testing the value of the most recently received subpage number SR(pagnr). If this is not the case, the page request program is terminated. However, if the requested page is found to be a rotating page, the user is informed about this in a step 149. The highest subpage number SH(pagnr) is tested in a step 1410. If this number is equal to "0", further data about the rotating page are still absent at the instant of requesting the page and the page request program is terminated. If SH(pagnr) is unequal to "0", the highest and lowest subpage numbers are determined and in a step 1411 the number of subpages "n" of the rotating page is calculated and stated to the user. The relevant calculation is as follows:

$n = SH(pagnr) - SL(pagnr) + 1.$

If desired, the next subpage number "nx" of the page still to be received is determined in a step 1412 by means of if SR(pagnr)=SH(pagnr) then nx=SL(pagnr) else nx=SR(pagnr)+1 and this subpage number is displayed on the display screen. The user's attention can also be drawn to the possibility of entering a subpage number in order to choose an individual subpage.

Figure 10A:
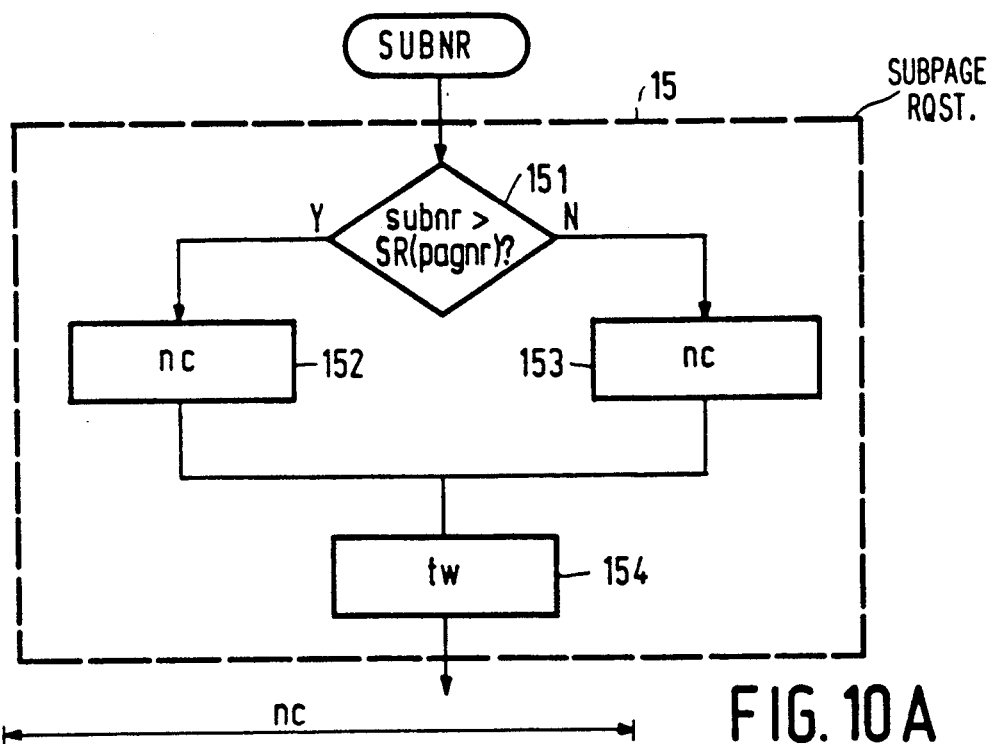
FIGS. 9, 10a, 10b and 11 show some diagrams to explain the operation of the television receiver shown in FIG. 1.

If the user indeed requests an individual subpage, subpage request program 15 will be activated. This program is shown in FIG. 10A. It is checked in a step 151 whether the entered subpage number "subnr" is larger than the subpage number SR(pagnr) of the most recently transmitted version of the requested page. If this is indeed the case, the number of cycli "nc" between the most recently transmitted subpage and the requested subpage is equal to $nc = subnr - SR(pagnr).$ This number is determined in a step 152. In a step 153 this number of cycli is determined if before receiving the requested page receiving the rest of the subcycle has to be awaited. The number of cycli now is:

$nc = \{SH(pagnr) - SR(pagnr)\} + 1 + \{subnr - SL(pagnr)\}.$

Figure 10B:
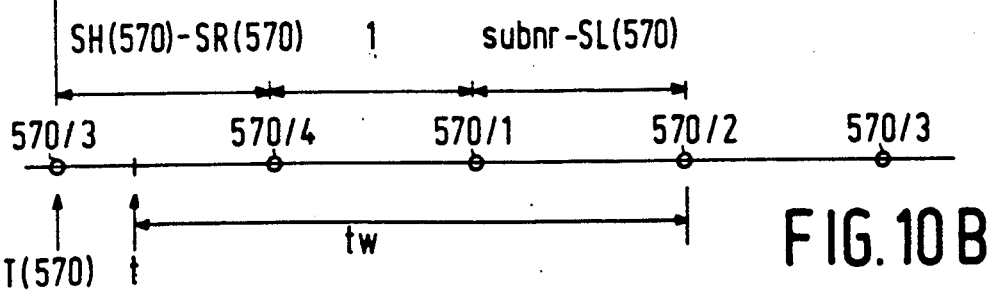

In FIG. 10B this calculation is explained with reference to the previously mentioned example of the stock exchange rates on page 570. In the Figure the version with subpage number subnr=2 of this page 570 is requested by the user at the instant t. The highest and lowest subpage numbers are SH(570)=4 and SL(570)=1, respectively, while the most recently received subpage number before the request was SR(570)=3 Subsequently the waiting time tw for the requested subpage is determined in a step 154 from the value of nc thus determined:

$tw = T(pagnr) + nc*C(pagnr) - t.$

Figure 11:
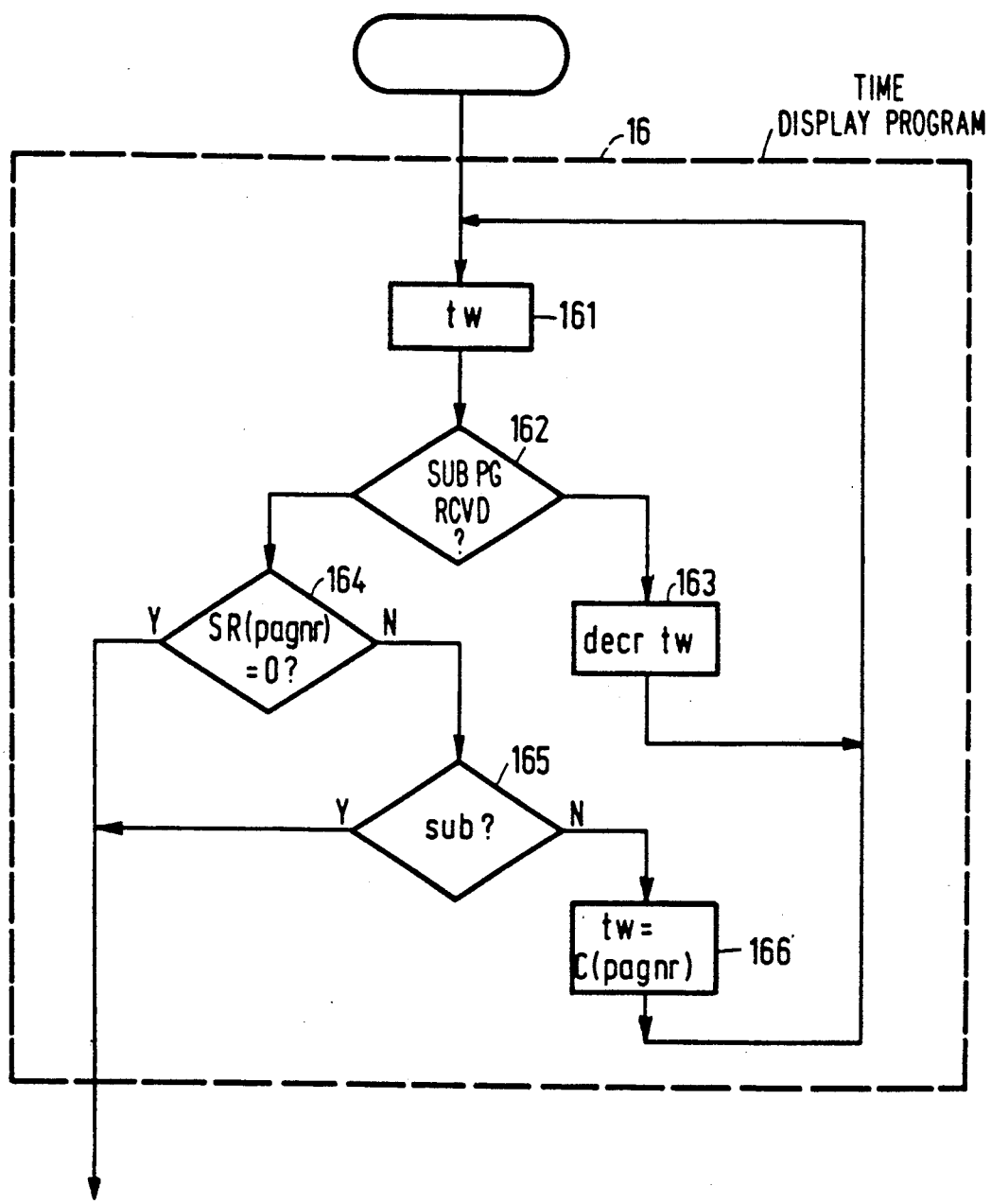

Consequently, already at the request of a (sub)page by the user it is determined how long the user will have to wait for the page. It is very convenient to visualize this waiting time on the display screen, for example in the form of a bar decreasing in length. The waiting time tw which has just been determined may be a measure of the initial length of the bar or of the rate at which the bar decreases in length. A display program 16 for this is shown in FIG. 11. The waiting time tw is displayed on the display screen in a step 161. It is subsequently checked in a step 162 whether the requested (sub)page has been received. As long as this is not the case, tw is decreased by an appropriate value in a step 163 and the program returns to step 161 so as to display the rest of the waiting time on the display screen. The reception of the page will now coincide with the instant when the value tw=0 is reached. If the received page is found to be a rotating page in a step 164 and if the user has not requested an individual subpage (step 165), the waiting time tw is again initialized in a step 166, now with the individual cycle period $tw = C(pagnr),$ and the display program returns to the start. It is achieved thereby that the reading time which is left is always visualized in the case of displayed rotating pages.

Finally it is to be noted that it has been found that the decoding program in decoding circuit 45 and the control program in control circuit 9 are performed well within the available time. It is therefore possible and useful to accommodate the programs jointly in one microprocessor in the television receiver. This microprocessor may then also perform further known tasks, such as tuning to stations, controlling picture and sound, receiving and decoding operating commands and the like.

We claim:

1. A teletext decoder for receiving cyclically transmitted teletext pages, comprising:
a decoding circuit for determining page numbers of teletext pages present in a transmitted cycle;
a memory medium for storing a reception indication for the transmitted teletext pages, indicating the presence of the pages in the transmitted cycle; and
means for determining and storing the cycle period at which the pages are transmitted, said means for determining including means for increasing the cycle period count during a predetermined period in response to the reception of a page whose reception indication is not yet stored, and then subtracting said predetermined period from the increased cycle period count.

2. A teletext decoder as claimed in claim 1, wherein for reception of a teletext page the decoding circuit includes means to store a further memory value for said page in the memory medium, which value is related to the instant when the page is transmitted.

3. A teletext decoder as claimed in claim 2, wherein the decoding circuit includes means to determine for each teletext page the individual cycle period between successive receptions of a page and to store said individual cycle period as a further memory value.

4. A teletext decoder as claimed in claim 3 wherein the coder includes means for determining and storing the individual cycle period between successive receptions of a teletext page for the teletext pages which are provided with an indication that the corresponding page number is outside the used numerical sequence of transmission.

5. A teletext decoder as claimed in claim 4, wherein the decoding circuit further includes means for removing the corresponding reception indication from the memory medium in response to a teletext page no longer being received during a predetermined period related to the cycle period after the most recent instant of reception.

6. A teletext decoder as claimed in claim 1 in which the decoding circuit includes means for determining and storing subpage numbers of rotating teletext pages having equal page numbers, the decoding circuit including further means for determining and storing the highest and the lowest subpage number as a further memory value.

7. A teletext decoder as claimed in claim 4, wherein the memory medium for storing reception indications and said further memory values comprises for each receivable page number of the corresponding page a memory location which is addressable by the page number.

8. A teletext decoder as claimed in claim 1 wherein for reception of a teletext page the decoding circuit includes means to store a further memory value for said page in the memory medium, which value is related to the instant when the page is transmitted.

9. A teletext decoder as claimed in claim 8 the decoding circuit includes means to determine for each teletext page the individual cycle period between successive receptions of a page and to store said individual cycle period as a further memory value.

10. A teletext decoder as claimed in claim 5 in which the decoding circuit includes means for determining and storing subpage numbers of rotating teletext pages having equal page numbers, the decoding circuit including further means for determining and storing the highest and the lowest subpage number as a further memory value.

11. A teletext decoder as claimed in claim 10 wherein the memory medium for storing reception indications and said further memory values comprises for each receivable page number a memory location which is addressable by the page number of the corresponding page.

12. A receiver for television and teletext signals, comprising:
tuning and demodulation means for obtaining a selected television and teletext signal; and
a teletext decoder receiving the teletext signal for receiving cyclically transmitted teletext pages including a character generator for generating a character signal, a display screen for displaying the television signal and the character signal, and a control circuit which is coupled to the teletext decoder and the character generator;
said decoder further comprising a decoding circuit for determining page numbers of teletext pages present in a transmitted cycle;
a memory medium for storing a reception indication for the transmitted teletext pages, indicating the presence of the pages in the transmitted cycle; and
means for determining and storing the cycle period at which the pages are transmitted;
said means for determining and storing the cycle period including means for assigning a predetermined period value upon receipt of an initial page of said cycle, increasing the cycle period value during this predetermined period an incremental period amount for each received page whose reception indication is not yet stored and then subtracting said predetermined period value from said increased incremental count period value.

13. A receiver for television and teletext signals as claimed in claim 12 wherein the teletext decoder comprises for reception of a teletext page means to store a further memory value for said page in the memory medium, which value is related to the instant when the page is transmitted, and in that the control circuit includes means for determining the waiting time until reception of the desired page and to display it on the display screen when a teletext page is requested.

14. A receiver for television and teletext signals as claimed in claim 13 wherein the control circuit includes means for determining the waiting time until reception of a selected subpage and to display it on the display screen when a subpage is selected.

15. A receiver for television and teletext signals as claims in claim 12 wherein the teletext decoder further comprises means for determining and storing subpage numbers of rotating teletext pages having equal page numbers, the decoding circuit including further means for determining and storing the highest and the lowest subpage number as a further memory value and in that the control circuit includes means for determining the reading time until reception of a next subpage and to display it on the display screen when a rotating teletext page is displayed.

16. A receiver for television and teletext signals as claimed in claim 15, characterized in that the control circuit includes means for determining the waiting time until reception of a selected subpage and to display it on the display screen when a subpage is selected.

17. A receiver for television and teletext signals as claimed in claim 11, wherein the control circuit includes means for determining the waiting time until reception of a selected subpage and to display it on the display screen when a subpage is selected.

18. A teletext decoder for receiving cyclically transmitted teletext pages, comprising:
   a decoding circuit for determining page numbers of teletext pages present in a transmitted cycle;
   a memory medium for storing a reception indication for the transmitted teletext pages indicating the presence of the pages in the transmitted cycle; and
   means for determining and storing the cycle period at which the pages are transmitted;
   said decoding circuit including for reception of a teletext page, means to store a further memory value for that page in the memory medium, which value is related to the instant when that page is transmitted, said means for determining for determining for each teletext page an individual cycle period between successive receptions of a page and to store said individual cycle period as a further memory value and for determining and storing the individual cycle period between successive receptions of a teletext page for the teletext pages which are provided with an indication that the corresponding page number is outside the used numerical sequence of transmission.

19. A receiver for television and teletext signals, comprising:
   tuning and demodulation means for obtaining a selected television and teletext signal; and
   a teletext decoder receiving the teletext signal for receiving cyclically transmitted teletext pages including a character generator for generating a character signal, a display screen for displaying the television signal and the character signal, and a control circuit which is coupled to the teletext decoder and the character generator;
   said decoder further comprising:
   a decoding circuit for determining page numbers of teletext pages present in a transmitted cycle;
   a memory medium for storing a reception indication for the transmitted teletext pages, indicating the presence of the pages in the transmitted cycle;
   means for determining and storing the cycle period at which the pages are transmitted;
   means for determining and storing subpage numbers of rotating teletext pages having equal page numbers;
   means for determining and storing the highest and the lowest subpage number as a further memory value; and
   means for determining the reading time until reception of a next subpage and to display it on the display screen when a rotating teletext page is displayed.

20. A receiver for television and teletext signals, comprising:
   tuning and demodulation means for obtaining a selected television and teletext signal; and
   a teletext decoder receiving the teletext signal for receiving cyclically transmitted teletext pages including a character generator for generating a character signal, a display screen for displaying the television signal and the character signal, and a control circuit which is coupled to the teletext decoder and the character generator;
   said decoder further comprising:
   a decoding circuit for determining page numbers of teletext pages present in a transmitted cycle;
   a memory medium for storing a reception indication for the transmitted teletext pages, indicating the presence of the pages in the transmitted cycle;
   means for determining and storing the cycle period at which the pages are transmitted; and
   means to store a further memory value for said page in the memory medium for reception of a teletext page, which value is related to the instant when the page is transmitted;
   said control circuit including means for determining 1) the waiting time until reception of the desired page and to display it on the display screen when a teletext page is requested and 2) the waiting time until reception of a selected subpage and to display it on the display screen when a subpage is selected.

* * * * *